Figure 1:
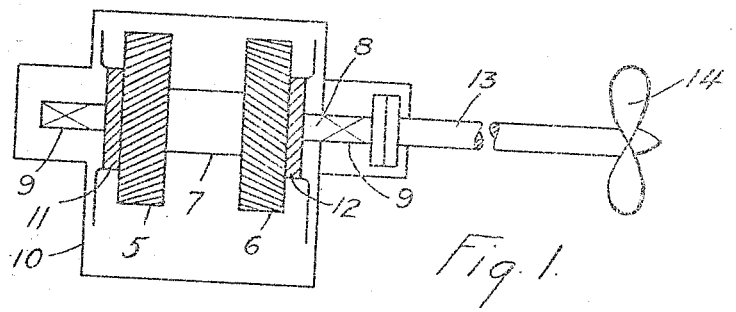

W. W. SMITH.
ORGANIZED THRUST BEARING AND REDUCTION GEARING.
APPLICATION FILED AUG. 3, 1915.

1,306,157.

Patented June 10, 1919.

INVENTOR.

William W. Smith

BY

HIS ATTORNEY IN FACT

UNITED STATES PATENT OFFICE.

WILLIAM W. SMITH, OF PITTSBURGH, PENNSYLVANIA, ASSIGNOR TO WESTINGHOUSE ELECTRIC & MANUFACTURING COMPANY, A CORPORATION OF PENNSYLVANIA.

ORGANIZED THRUST-BEARING AND REDUCTION-GEARING.

1,306,157.  Specification of Letters Patent.  Patented June 10, 1919.

Application filed August 3, 1915. Serial No. 43,409.

*To all whom it may concern:*

Be it known that I, WILLIAM W. SMITH, a citizen of the United States, and a resident of Pittsburgh, in the county of Allegheny and State of Pennsylvania, have made a new and useful Invention in Organized Thrust-Bearing and Reduction-Gearing, of which the following is a specification.

This invention relates to marine propulsion, and particularly to marine turbine installations in which reduction gearing are employed between the turbine or turbines and the ship's propellers.

In marine installations, in which turbines are employed, it is the usual practice to employ reduction gearing between the turbines and the propellers, since turbines usually rotate at speeds higher than are desirable for propellers. In installations of this type; that is, in which the propeller of the ship and the turbine spindle are not continuous, or are not directly coupled together, it is necessary to provide thrust blocks or bearings for absorbing or counterbalancing the axial longitudinal thrust of the propeller. Such thrust blocks or bearings are usually arranged as separate units, transmitting the propeller thrust to the ship's hull through a separate seating. This involves a considerable waste of space, and also increases the weight and cost of the installation.

An object of the present invention is to provide an improved construction which avoids the above noted disadvantages.

This and other objects are attained by means of apparatus embodying the features herein described and illustrated in the drawings accompanying and forming a part hereof.

In the drawings, Figure 1 is a more or less diagrammatic view of a reduction gearing directly coupled to a propeller shaft and provided with a thrust bearing which is mounted on or forms a part of the gear casing or frame.

Figure 2:
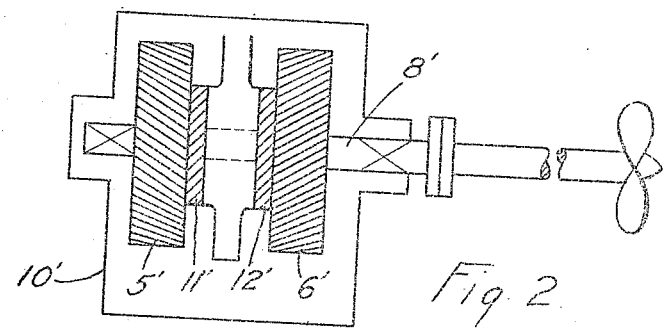
Figure 3:
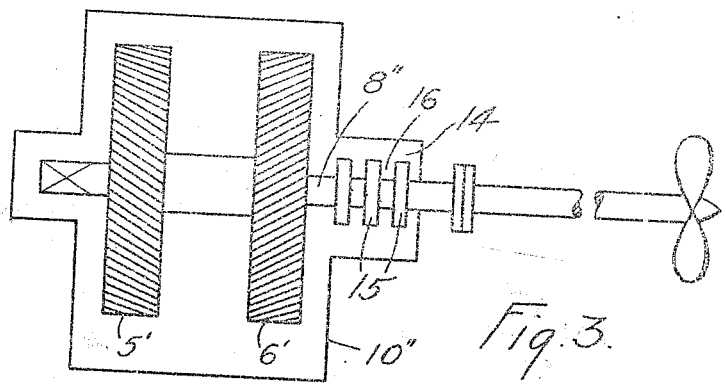

Fig. 2 is a view corresponding to Fig. 1, illustrating a modification of my invention; and Fig. 3 is a corresponding view in which a further modification of the invention is illustrated.

The invention consists in combining, in a geared marine turbine installation, a gear wheel casing or frame and a thrust block or bearing whereby the parts may be attached to the ship's structure by a single seating.

In reduction gearing for transmitting relatively large powers, it is the usual practice to employ gears having helical gear teeth, since such gears are stronger than those provided with straight axially extending teeth, and since more teeth are simultaneously in mesh than with gears provided with straight axial teeth. The inclination of the teeth on the gears tends to produce an axial or longitudinal thrust by reason of the unbalanced axial or longitudinal component of the tooth pressure. For this reason it is customary to provide the intermeshing gears with two sets of teeth which are oppositely inclined, so that the axial component of the tooth pressure of one set is counterbalanced by that of the other set.

In Fig. 1, I have illustrated the main or driven gear of such a reduction gearing. It is shown as provided with two sets of oppositely inclined helical teeth 5 and 6 which are mounted on a drum 7. The drum is provided with a shaft or spindle 8, which is journaled in bearings 9, located on opposite sides of the drum 7. The bearings are in turn mounted on a frame or casing 10, which is adapted to be secured to the ship's hull and which may be so formed that it incloses the main gear and also the driving gear or pinion meshing with it.

By providing a single frame 10, in which both the bearings 9 are mounted, the operation of installing the gear is materially simplified and difficulties in bearing alinement are avoided, since the entire gearing is installed by a single setting, and is mounted on a single seating.

As shown in Fig. 1, thrust blocks or bearings 11 and 12 are formed integrally with the frame 10 or bearing supporting member of the reduction gearing. One of the blocks is employed for the purpose of counterbalancing or absorbing the axial or longitudinal thrust of the propeller when the ship is being driven ahead, and the other is provided for performing a like function when the ship is being driven astern. As illustrated, the shaft 13 of the propeller 14 is directly coupled to the shaft 8 of the main gearing so that the longitudinal thrust of the propeller is transmitted to the shaft 8.

In the drawings, the drum 7 of the main or driven gear is diagrammatically illustrated as forming one element of both the thrust bearings 11 and 12, and is provided with shoulders or end faces which coöperate with the respective blocks. With such a construction, the propeller thrust is counterbalanced within the reduction gearing itself while the vessel is being propelled ahead or astern, and the necessity of providing a separate thrust block which is secured to the ship's hull by separate seating is overcome.

In Fig. 2 I have illustrated a construction in which the thrust blocks are located between the separate sets of teeth 5' and 6', both of which are operatively secured to a shaft or spindle 8', mounted in bearings supported by a single bearing support or frame 10'. Thrust blocks or bearings 11' and 12' are located between the separate sets of teeth, the one coöperating with the drum on which the set of teeth 5' are mounted, and the other coöperating with the drum on which the set of teeth 6' are mounted. In this way propeller thrusts in either direction are absorbed by the bearing supporting frame 10' or are transmitted by the frame to the ship's hull.

In Fig. 3 the shaft 8" of the main gear is provided at one side of the gear with a thrust bearing 14, comprising a plurality of collars 15 integrally formed with or rigidly mounted on the shaft 8", and coöperating with a plurality of disks 16, rigidly mounted on the bearing supporting frame 10", the construction being such that the thrust is counterbalanced by the thrust bearings, while the ship is being driven ahead or astern.

From the above, it will be apparent that my invention contemplates the production of an organized apparatus including a thrust bearing and a reduction gearing and that any type of thrust may be employed which transmits the thrust imparted to it to the bearing-supporting frame of the gearing.

It will be apparent to those skilled in the art that various changes, modifications, substitutions, additions and omissions may be made in the apparatus illustrated without departing from the spirit and scope of the invention as set forth by the appended claims.

What I claim is:

1. In combination with a casing and bearing support of a reduction gearing, a thrust bearing mounted on the bearing support and forming a substantially integral unit with the casing and bearing support.

2. In combination in a geared marine turbine installation, a driven gear of a reduction gearing, a casing inclosing the gears, a bearing support for the bearings of said gear forming a part of said casing, a propeller shaft directly coupled to the shaft of the gearing, and a thrust bearing for the shaft of the gear, mounted on the bearing support.

3. In combination in a geared marine turbine installation, a driven gear of a reduction gearing, having its gear teeth formed in two sets, a propeller shaft directly coupled to the shaft of the gear, a bearing support for the bearings of the gear, and thrust blocks mounted on the bearing support, one being located on one side of one set of gear teeth, and the other being located on the opposite side of the other set of gear teeth.

4. In combination in a geared marine turbine installation, a driven gear of a reduction gearing, a shaft on which the gear is mounted, a casing inclosing the gearing, bearings for said shaft, a bearing support for said bearings forming a part of the gear casing, a propeller shaft, a coupling for directly connecting said propeller shaft with the gear shaft, and thrust blocks mounted on the bearing support, and coöperating with said gear.

5. In a geared marine installation, a driven gear of a reduction gearing, a combined bearing supporting frame and casing for said gear, a propeller shaft directly connected to said gear and a thrust block integrally formed on the bearing support.

6. In combination in a geared marine turbine installation, a reduction gearing including a casing, bearings in said casing, a shaft journaled in said bearings, a driven gear mounted on said shaft and comprising a drum having two sets of oppositely inclined peripherally located helical teeth, and an ahead and reversing thrust block mounted on said casing for transmitting to the casing axial thrusts imparted to said shaft.

7. In combination in a geared marine turbine installation, a reduction gearing including a casing, bearings in said casing, a shaft journaled in said bearings, a driven gear mounted on said shaft and comprising a drum having two sets of oppositely inclined peripherally located gear teeth spaced apart axially of said shaft, and an ahead and reversing thrust block mounted on said casing for transmitting to the casing axial thrusts imparted to said shaft.

In testimony whereof, I have hereunto subscribed my name this 31st day of July, 1915.

WILLIAM W. SMITH.